(12) United States Patent
Bjørklund et al.

(10) Patent No.: US 8,414,777 B2
(45) Date of Patent: Apr. 9, 2013

(54) COALESCING APPARATUS, EMULSION TREATMENT SYSTEM AND METHOD FOR COALESCING

(75) Inventors: Erik Bjørklund, Oslo (NO); Pål J Nilsen, Bødalen (NO)

(73) Assignee: Hamworthy PLC, Poole (GB)

( * ) Notice: Subject to any disclaimer, the term of this patent is extended or adjusted under 35 U.S.C. 154(b) by 789 days.

(21) Appl. No.: 12/340,805

(22) Filed: Dec. 22, 2008

(65) Prior Publication Data

US 2009/0159534 A1     Jun. 25, 2009

(30) Foreign Application Priority Data

Dec. 21, 2007 (NO) .................................. 20076605

(51) Int. Cl.
*B01D 17/04* (2006.01)
(52) U.S. Cl. .................. 210/708; 210/177; 210/748.01; 204/666; 204/672; 204/671
(58) Field of Classification Search .................. 210/634, 210/708, 748, 194, 195.1, 177, 243, 748.01; 204/660, 672, 563, 554, 268, 555, 674, 667, 204/671, 564; 422/186.04, 201, 198, 199, 422/200, 186; 250/437, 438, 436
See application file for complete search history.

(56) References Cited

U.S. PATENT DOCUMENTS

| | | | | |
|---|---|---|---|---|
| 2,832,431 A | * | 4/1958 | Lovelady et al. | 96/186 |
| 3,798,153 A | * | 3/1974 | Arndt | 208/48 AA |
| 6,113,765 A | * | 9/2000 | Wagner et al. | 204/556 |
| 2004/0226694 A1 | * | 11/2004 | Dilley et al. | 165/82 |
| 2005/0040045 A1 | * | 2/2005 | Nilsen et al. | 204/672 |

FOREIGN PATENT DOCUMENTS

| | | |
|---|---|---|
| WO | WO-01/85297 A1 | 11/2001 |
| WO | WO 03/039706 | 5/2003 |
| WO | WO-03/039706 A1 | 5/2003 |

OTHER PUBLICATIONS

UK Search Report, dated Dec. 18, 2008, issued in connection with counterpart British Application No. GB0815528.5.
Norwegian Search Report—Jun. 24, 2008.

* cited by examiner

*Primary Examiner* — Joseph Drodge
*Assistant Examiner* — Cameron J Allen
(74) *Attorney, Agent, or Firm* — Venable LLP; Eric J. Franklin

(57) ABSTRACT

A coalescing apparatus including a casing having an inner chamber for accommodating insulating fluid. At least one tube of electrically insulating material extends through the casing and the chamber. Each tube forms a flow channel for emulsion to be treated. A set of electrodes is mounted in the chamber. The tube is allotted at least one pair of electrodes of the set. A voltage set is configured to apply mutually different electric potentials to the electrodes of each electrode pair so as to form an electric field between them and thereby an electric field inside the respective tube. A heater is configured to heat the insulating fluid so as to allow the insulating fluid to transfer heat to emulsion flowing through at least one tube and thereby raise the temperature of the emulsion. An emulsion treatment system includes a coalescing apparatus. A coalescing method.

11 Claims, 4 Drawing Sheets

COALESCING APPARATUS, EMULSION TREATMENT SYSTEM AND METHOD FOR COALESCING

CROSS-REFERENCE TO RELATED APPLICATIONS

This application claims priority to Norwegian patent application 20076605 filed 21 Dec. 2007.

FIELD OF THE INVENTION AND PRIOR ART

The present invention relates to a coalescing apparatus and a method for coalescing one or several emulsion components in an emulsion containing emulsion components of different electrical properties. The invention also relates to an emulsion treatment system comprising such a coalescing apparatus.

The invention is particularly applicable to electrostatic coalescing apparatuses for promoting the coalescence of water in an emulsion comprising oil and water. However, the invention is applicable to any type of coalescing application where it possible to promote the coalescence of an emulsion component in an emulsion comprising a mixture of at least two different fluid components by means of an electric field applied to the emulsion.

In the oil and gas industry where oil is extracted from one or more wells in an oil field, oil will be extracted together with water. The water has to be removed from the oil and this is mainly done by means of settling tanks in which the water in the oil is permitted to settle under the action of gravity. However, stable oil-water emulsions may develop during the production of the oil. For example, heavy shearing in valves or the use of gas-liquid cyclones might contribute to a stable emulsion that will be difficult to separate only by means of gravity settling. After having passed through a series of gravitational settling tanks, a certain amount of water normally remains in the oil in the form of droplets. In order to promote the separation of this remaining water content, which is difficult to separate from the oil only by means of further gravitational settling, different types of coalescing devices have been proposed taking advantage of the fact that water and oil have different electrical properties.

It is well known to use electrostatic coalescing devices in order to achieve water droplet enlargement or coalescence of water in water-in-oil emulsions, whereupon the water can be separated more easily from the oil, e.g. by means of gravitational separation or the like. An electrostatic coalescing device can be employed to speed up the separation of any emulsion where the continuous phase is an electrical insulator, such as oil, and the dispersed phase has a different permittivity and/or different conductivity than said continuous phase. The dispersed phase may for instance be an electrical conductor, such as water. In an electrostatic coalescing device, an emulsion is subjected to an alternating current field or to a continuous or pulsed direct current field.

An advantageous coalescing device is described in WO 03/039706 A1. This known coalescing device comprises a number of electrostatic coalescer elements which are arranged in a matrix covering the cross-sectional area of a separator vessel. The well fluids are forced to flow through this matrix of coalescer elements, which provides the coalescing effect and simultaneously acts as a flow straightener. Each coalescer element is provided with insulated electrodes for applying an electric field to the passing well fluids.

SUMMARY OF THE INVENTION

An object of the present invention is to provide a coalescing apparatus of new and advantageous design.

The coalescing apparatus of the invention comprises:
a casing with an inner chamber for accommodating insulating fluid;
one or several tubes of electrically insulating material extending through the casing and through said inner chamber, each one of said tubes having an intake opening at a first end for receiving an emulsion to be treated and a discharge opening at the other end for discharging the emulsion from the tube, the inner space of each tube being sealed from said chamber so as to prevent emulsion from penetrating into said chamber;
a set of electrodes mounted in said chamber, each one of said tubes being allotted at least one pair of electrodes of said set;
voltage source means configured to apply mutually different electric potentials to the electrodes of each electrode pair so as to form an electric field between them and thereby an electric field inside the respective tube; and
a heating device configured to heat the insulating fluid to a temperature above the temperature of the emulsion entering said tubes so as to allow the insulating fluid in said chamber to transfer heat to emulsion flowing through said tubes and thereby raise the temperature thereof.

In the coalescing apparatus according to the present invention, the emulsion can be heated by means of the insulating fluid when passing through the tubes. Thus, the emulsion is heated inside the tubes while simultaneously being subjected to coalescing under the effect of the electric field produced inside the tubes by the electrode pairs arranged on the outside thereof. With the inventive solution, a beneficial temperature increase of the emulsion can be achieved without requiring any separate heating apparatus in the process line for the emulsion. The heating will locally reduce the viscosity of the emulsion and thereby enhance the mobility of the dispersed phase, which thereby will be more susceptible to the attractive electrostatic forces set up by the energized pair of electrodes. This heating will therefore result in significantly increased droplet growth and more efficient separation and allow of more compact equipment.

In contrast to a conventional system with an upstream external heater (for instance in the form of a shell and tube heater) and a gravity separator, this invention enables beneficial heating of a high viscosity emulsion making the equipment more energy efficient.

Further advantages as well as advantageous features of the coalescing apparatus according to the invention will appear from the following description.

The invention also relates to an emulsion treatment system.

The invention also relates to a method for coalescing one or several emulsion components in an emulsion containing emulsion components of different electrical properties, wherein the emulsion is conveyed through one or several tubes of electrically insulating material while being heated and subjected to an electric field therein.

BRIEF DESCRIPTION OF THE DRAWING

With reference to the appended drawing, a specific description of preferred embodiments of the invention cited as examples follows below. In the drawings.

DETAILED DESCRIPTION OF PREFERRED EMBODIMENTS OF THE INVENTION

Figure 1:
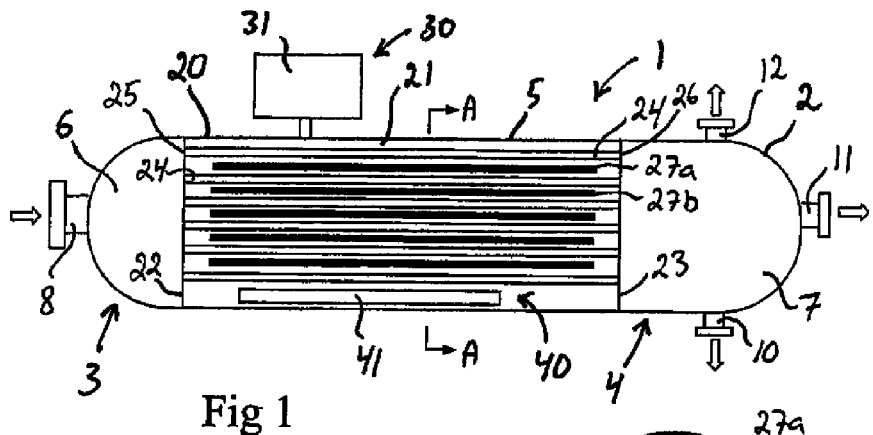
FIG. 1 is a schematic diagram of a coalescing apparatus according to a first embodiment of the present invention.

FIGS. 1-4 illustrate different embodiments of a coalescing apparatus 1 according to the present invention. In the illustrated embodiments, the coalescing apparatus 1 is included in an emulsion treatment system comprising a tank 2, which includes an inlet section 3 for receiving an emulsion to be treated in the coalescing apparatus and an outlet section 4. However, a coalescing apparatus 1 according to the present invention could also be arranged without such a tank, for instance within a process pipeline.

The coalescing apparatus 1 comprises a casing 20 with an inner chamber 21 for accommodating an insulating fluid, for instance in the form of transformer oil. In the illustrated embodiments, the casing 20 is formed by a part of the outer wall 5 of the tank 2 and two walls 22, 23. One of said walls forms a first end wall 22 for the casing 20 and the other one forms a second end wall 23 for the casing. The first end wall 22 is configured to separate the chamber 21 from the inlet section 3 of the tank and the second end wall 23 is configured to separate the chamber 21 from the outlet section 4 of the tank. The first end wall 22 forms a fluid-tight barrier between the chamber 21 and the inlet section 3, whereas the second end wall 23 forms a fluid-tight barrier between the chamber 21 and the outlet section 4. Thus, insulating fluid accommodated in the chamber 21 is prevented by the end walls 22, 23 from entering the inlet section 3 and the outlet section 4. Likewise, emulsion received in the inlet section 3 or the outlet section 4 is prevented by the end walls 22, 23 from entering the chamber 21.

A number of tubes 24 of electrically insulating material extend through the casing 20 and through the inner chamber 21 of the casing. Each one of said tubes 24 has an intake opening 25 at a first end for receiving an emulsion to be treated and a discharge opening 26 at the other end for discharging the emulsion from the tube 24. Thus, each tube 24 forms a flow channel for emulsion to be treated. The inner space of each tube 24 is sealed from the chamber 21 so as to prevent emulsion from penetrating into the chamber from the tube. In the illustrated embodiments, the respective tube 24 extends between the first end wall 22 and the second end wall 23 of the casing 20 so as to allow the tubes 24 to receive emulsion from the inlet section 3 and discharge emulsion to the outlet section 4.

The tubes 24 may be made of any suitable electrically insulating material. The tubes 24 are suitably made of ceramic material or glass. Tubes of ceramic material are favourable owing to the fact that ceramic materials are capable of withstanding high temperatures and have good chemical resistance and stable electrical properties. In addition, ceramic materials have a very high arc resistance, which makes possible the use of very high field strengths. There are many ceramic materials that may be suitable for this application. Suitable varieties include ceramics fired at high temperatures, such as feldspar ceramics, aluminium nitride ceramics and composite ceramics. There are also many varieties of glass suitable for this application, for instance sodium glasses and hardened boron silicate glasses, such as Pyrex®.

The respective tube 24 suitably has a preferred length of at least 30 times its diameter. The use of long slender tubes will allow a long retention time for the emulsion in the electric field inside the tubes and will at the same time give a very short vertical distance for sedimentation. Thus, long slender tubes 24 are ideal for separation in the tubes.

Figure 3:
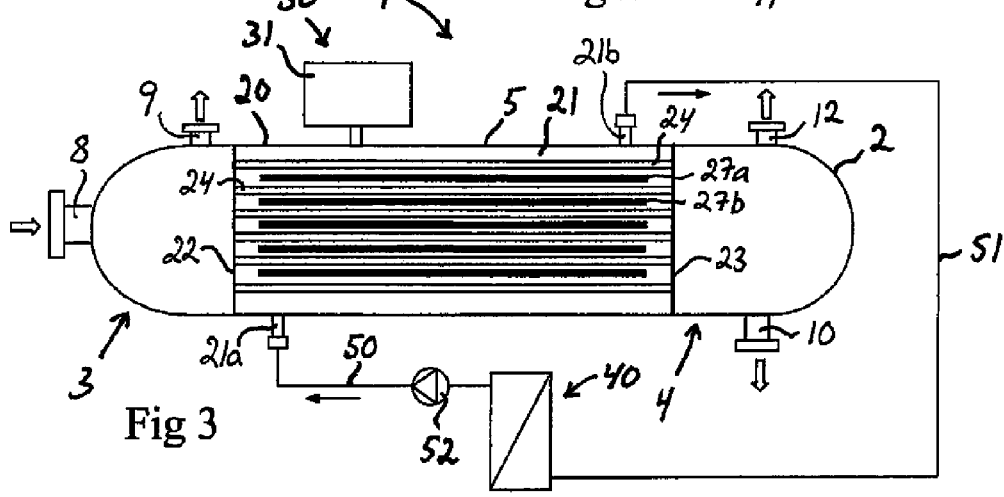
FIG. 3 is a schematic diagram of a coalescing apparatus according to a second embodiment of the present invention.

The casing 20 is arranged between the inlet section 3 and the outlet section 4 so as to allow emulsion to flow from the inlet section 3 to the outlet section 4 through the tubes 24. In the illustrated embodiments, the tubes 24 form the only flow passages between the inlet section 3 and the outlet section 4. The inlet section 3 may with advantage comprise a pre-separation chamber 6 for allowing knock out of any free water included in the emulsion entering the coalescing apparatus. The outlet section may with advantage comprise a settling chamber 7 for allowing proper separation and splitting of the phases of the emulsion. The inlet section 3 is provided with an inlet 8 for receiving an emulsion to be treated by the coalescing apparatus. The inlet section 3 may also be provided with a gas outlet 9 in its upper part for discharge of gas that has been accumulated in the upper part of the inlet section, as illustrated in FIG. 3. In the embodiments illustrated in FIGS. 1 and 4, the outlet section 4 is provided with a first outlet 10 for a first emulsion component, for instance water, that has been separated from the emulsion in the vessel under the action of gravity, and a second outlet 11 for a second emulsion component, for instance oil, or the remaining emulsion from which at least a part of said first emulsion component has been separated. In the embodiment illustrated in FIG. 3, the outlet section 4 is provided with only one emulsion outlet 10. In the embodiments illustrated in FIGS. 1 and 3, the outlet section 4 is also provided with a gas outlet 12 in its upper part for discharge of gas that has been accumulated in the upper part of the outlet section.

A set of electrodes 27a, 27b is mounted in the chamber 21, each one of the tubes 24 being allotted at least one pair of electrodes of said set. The electrodes 27a, 27b are surrounded by insulating fluid in the chamber 21. Thus, the insulating fluid is used as electrical insulation for the electrodes. The electrodes 27a, 27b are suitably sheet-shaped, the respective tube 24 having a first sheet-shaped electrode 27a arranged on a first side of the tube and a second sheet-shaped electrode 27b arranged on the opposite side thereof. Alternatively, each tube 24 may be provided with two elongated electrodes arranged on or integrated in the tube wall in parallel with each other, as disclosed in WO 2001/085297 A1.

Figure 2:
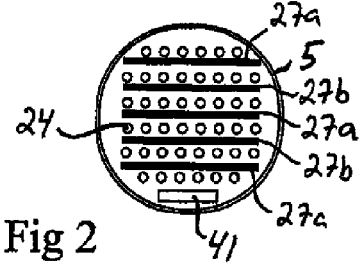
FIG. 2 is a cut along the line A-A in FIG. 1.
Figure 8:
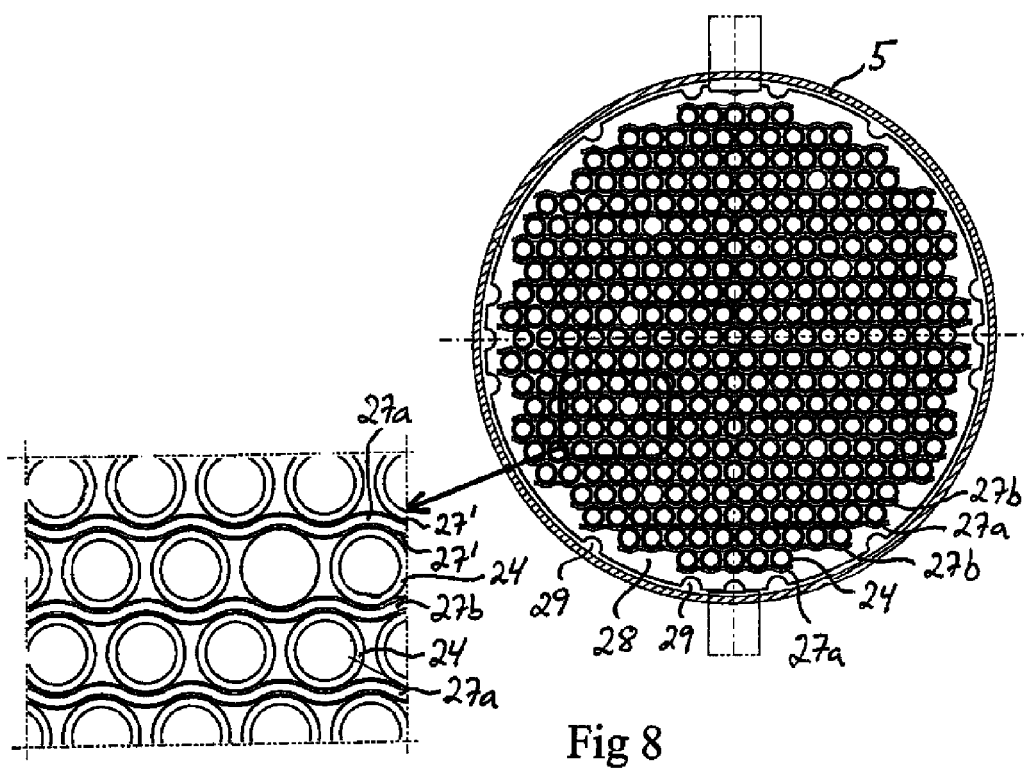
FIG. 8 is a cut along the line C-C in FIG. 5, with one part shown in a detail enlargement.

In the illustrated embodiments, the coalescing apparatus 1 comprises several tubes 24 arranged parallel to each other in rows, as illustrated in FIGS. 2 and 8, with the electrodes 27a, 27b arranged as horizontal plates between the tube rows. The electrodes could alternatively be arranged as vertical plates between tube columns.

The coalescing apparatus 1 further comprises voltage source means 30 configured to apply mutually different electric potentials to the electrodes 27a, 27b of each electrode pair so as to form an electric field between them and thereby an electric field inside the respective tube 24. The voltage source means 30 comprises a suitable voltage source 31, preferably in the form of a high-voltage transformer. The voltage source 31 included in the voltage source means could be an alternating voltage source or a pulsed direct-current voltage source.

The coalescing apparatus 1 further comprises a heating device 40 configured to heat the insulating fluid to a temperature above the temperature of the emulsion entering the tubes 24 so as to allow the insulating fluid in the chamber 21 to transfer heat to emulsion flowing through the tubes 24 and thereby raise the temperature thereof. This temperature increase will cause a favourable decrease of the viscosity of the emulsion.

The heating device 40 may comprise one or several electrical heating elements 41 arranged in the chamber 21, for instance at the bottom thereof, in contact with the insulating fluid in the chamber, as illustrated in FIG. 1, or arranged in contact with the casing 20 on the outside thereof. Said heating elements 41 may be supplied with electric energy by the voltage source means 30. In this case, the insulating fluid is caused to circulate automatically inside the chamber 21 under the effect of natural convection. The internal pressure of the chamber 21 may be balanced against the outside of the chamber by means of expansion bellows or any other suitable type of pressure balancing means.

Figure 4:
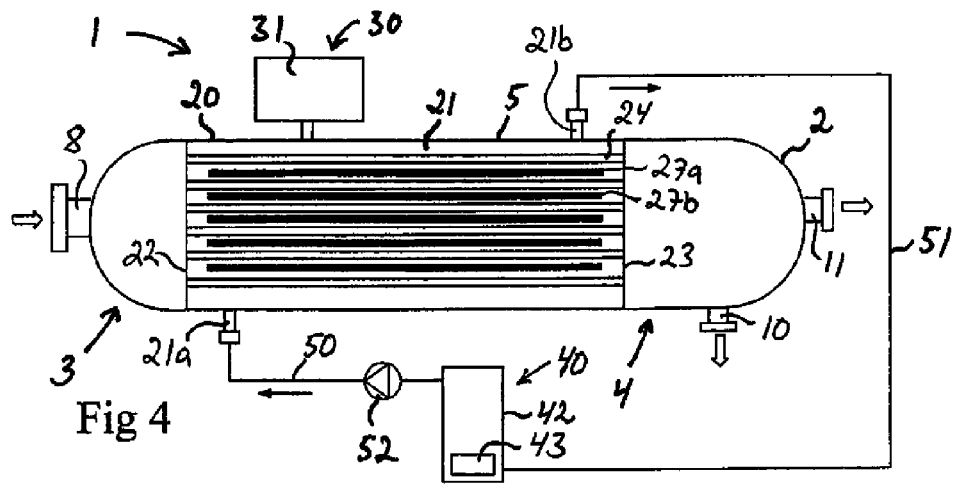
FIG. 4 is a schematic diagram of a coalescing apparatus according to a third embodiment of the present invention.

In the embodiments illustrated in FIGS. 3 and 4, the heating device 40 is arranged outside the casing 2 and a fluid inlet pipe 50 extends between the heating device 40 and a fluid inlet 21a of the chamber 21 for supplying heated insulating fluid to the chamber 21 from the heating device. A fluid outlet pipe 51 extends between a fluid outlet 21b of the chamber 21 and the heating device 40 for returning insulating fluid from the chamber 21 to the heating device. A pumping device 52 is arranged in the flow circuit formed by the heating device 40, the fluid inlet pipe 50, the chamber 21 and the fluid outlet pipe 51. This pumping device may comprise one or several pumps and is configured to make the insulating fluid circulate from the heating device 40 to the chamber 21 via the inlet fluid pipe 50, through the chamber 21 and then back to the heating device 40 via the fluid outlet pipe 51. The inlet 21a for insulating fluid is preferably arranged at the bottom of the chamber 21 and the outlet 21b at the upper part thereof.

In the embodiment illustrated in FIG. 3, the heating device 40 has the form of a heat exchanger, which is configured to transfer heat from a suitable medium to insulating fluid passing through the heat exchanger.

In the embodiment illustrated in FIG. 4, the heating device 40 comprises a vessel 42 provided with one or several electrical heating elements 43. Insulating fluid is heated inside the vessel 42 by the heating element/elements 43. The vessel 42 is connected to the casing 20 via the fluid inlet pipe 50 so as to allow insulating fluid heated in the vessel to be supplied to the chamber 21. The vessel 42 is also connected to the casing 20 via the fluid outlet pipe 51 so as to allow insulating fluid to be returned to the vessel after cooling in the chamber 21.

In the embodiment illustrated in FIGS. 5-8, the tubes 24 may be supported between the end walls 22, 23 by vertically extending support plates 28, which are mounted in the chamber 21 parallel to the end walls 22, 23 and spaced apart as seen in the longitudinal direction of the tubes so as to form different sections of tubes. The support plates 28 are provided with through holes 29 so as to allow insulating fluid to pass from one side of a support plate to the opposite side thereof. The support plates 28 are configured to give the insulating fluid a suitable flow pattern through the chamber 21. The tubes may also be supported directly by the end walls 22, 23, which will then form support plates for the tubes, as illustrated in FIGS. 1, 3 and 4.

The end walls 22, 23 and the support plates 28 are suitably made of stainless steel.

The electrodes 27a, 27b are with advantage corrugated, with alternating ridges and valleys extending along the surface of the respective electrode. The ridges and valleys of the corrugated electrodes are preferably wave-like, as illustrated in FIG. 8, with a radius of curvature essentially corresponding to the radius of the tubes 24. The tubes 24 are received in the valleys of the corrugated electrodes.

The electrodes 27a, 27b may be coated on both sides by a coating 27' of Teflon or any other suitable insulating material, as illustrated in FIG. 8.

Figure 5:
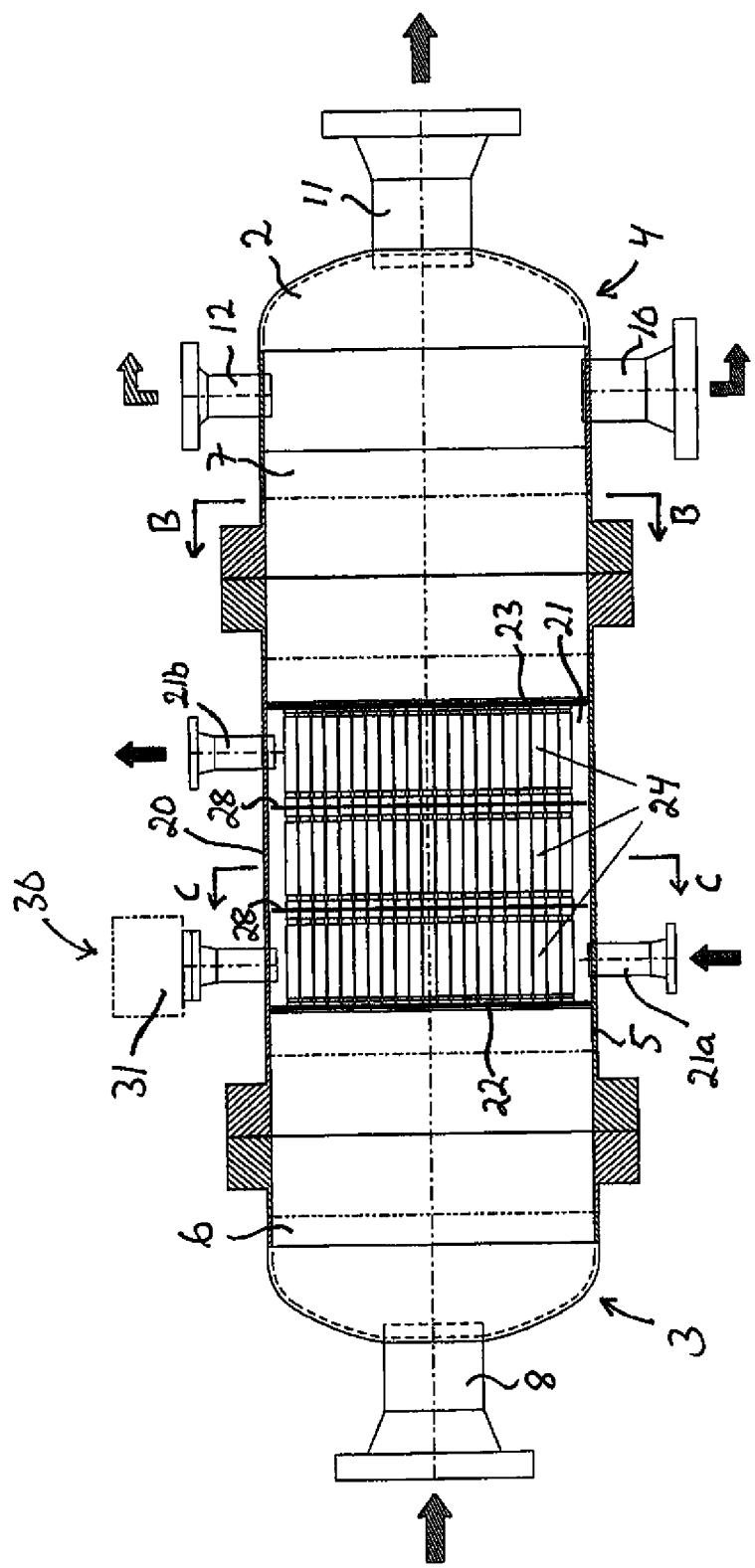
FIG. 5 is a partly cut lateral view of a tank provided with a coalescing apparatus according to an embodiment of the present invention.
Figure 6:
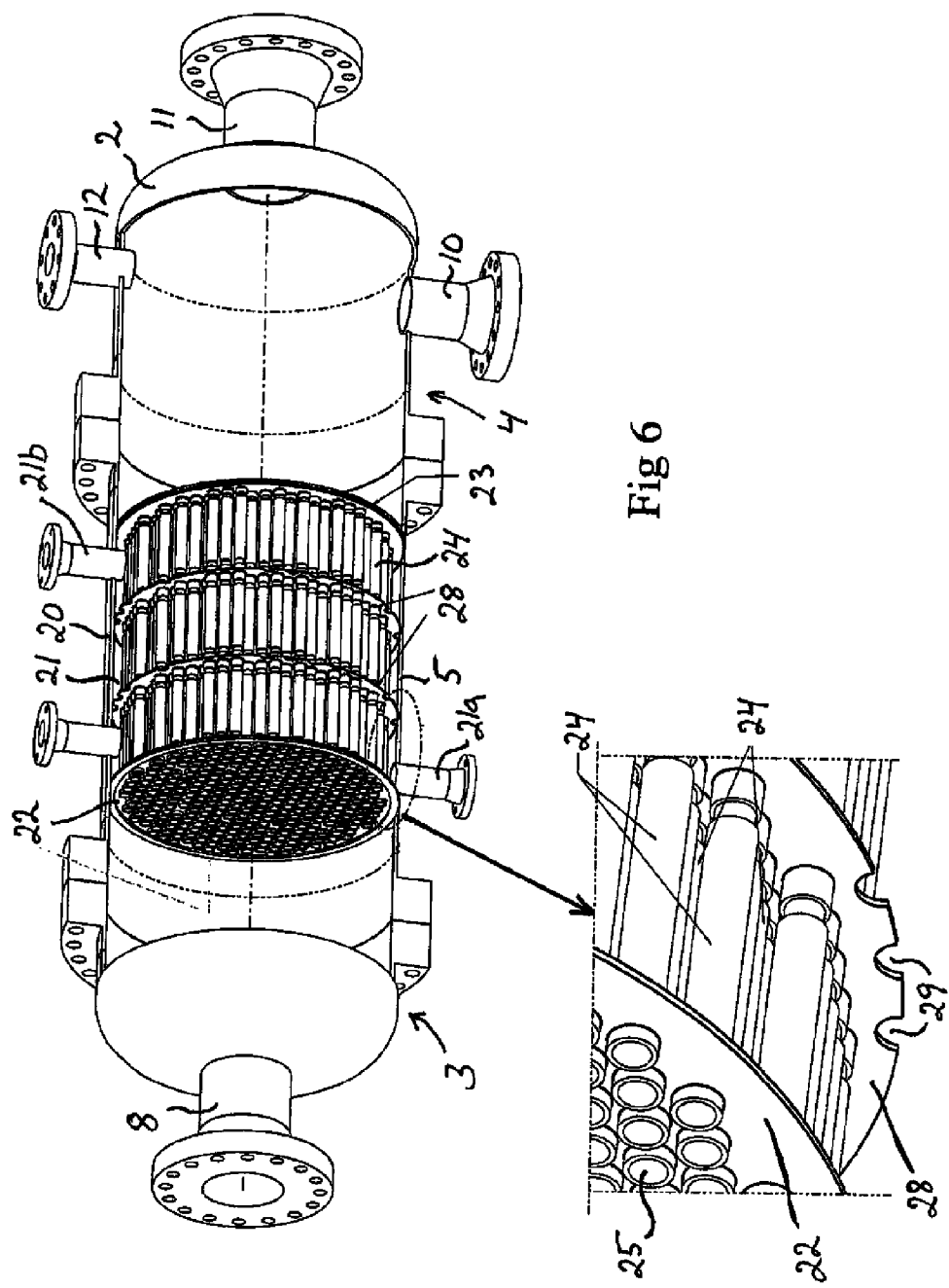
FIG. 6 shows the tank of FIG. 5 in a party cut perspective view, with one part shown in a detail enlargement.
Figure 7:
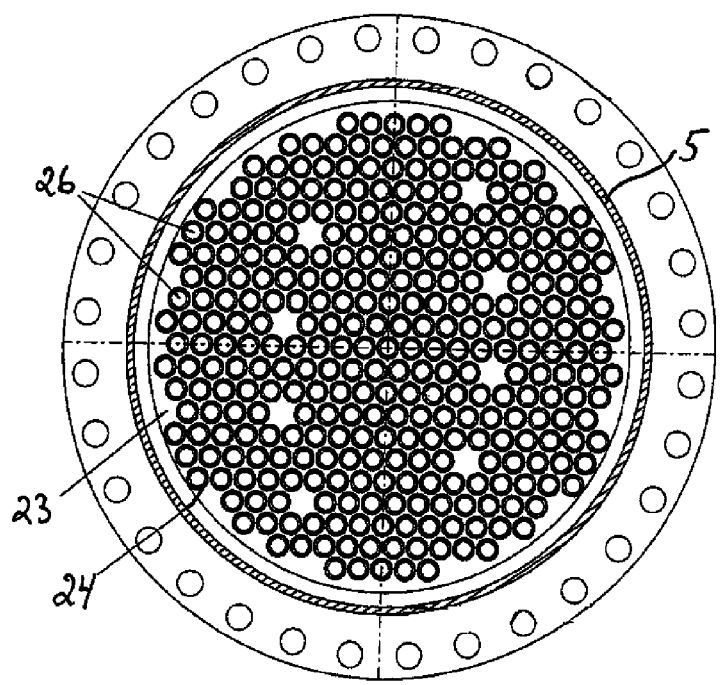
FIG. 7 is a cut along the line B-B in FIG. 5.

In FIGS. 5 and 6, the electrodes between the tubes 24 have been omitted for the sake of clarity.

Although the invention is applicable to any type of oil-treatment line, it is particularly advantageous in off-shore applications for promoting or effectuating separation of water from oil or water droplet enlargement.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A coalescing apparatus, comprising:
   a casing comprising an inner chamber for accommodating an electrically insulating fluid;
   at least one tube of electrically insulating solid material extending through the casing and through said inner chamber, each of said at least one tube comprising an intake opening at a first end for receiving an emulsion to be treated and a discharge opening at a second end for discharging the emulsion from the at least one tube, an inner space of each at least one tube being sealed from said chamber so as to prevent emulsion from penetrating into said chamber;
   a set of electrodes mounted in said chamber, each one of said at least one tube being allotted at least one pair of electrodes of said set;
   a voltage source configured to apply mutually different electric potentials to the electrodes of each electrode pair so as to form an electric field between them and thereby an electric field inside the respective tube; and
   a heater configured to heat the electrically insulating fluid to a temperature above a temperature of the emulsion entering said at least one tube so as to allow the electrically insulating fluid in said chamber to transfer heat to the emulsion flowing through said at least one tube and thereby raise the temperature thereof.

2. The coalescing apparatus according to claim 1, further comprising:
   a pump configured to make the insulating fluid circulate through said chamber.

3. The coalescing apparatus according to claim 1, wherein the heater is arranged outside the casing, the coalescing apparatus further comprising:
   a fluid inlet pipe extending between the heater and the casing for supplying heated insulating fluid to said chamber from the heater and a fluid outlet for returning insulating fluid from said chamber to the heater.

4. The coalescing apparatus according to claim 1, wherein the heater is arranged in said chamber.

5. The coalescing apparatus according to claim 1, wherein the respective tube comprises ceramic material or glass.

6. The coalescing apparatus according to claim 1, further comprising:
   a plurality of tubes arranged parallel to each other in rows and/or columns with the electrodes arranged as plates between the tube rows or tube columns.

7. The coalescing apparatus according to claim 1, wherein the tube has a length of at least 30 times a diameter of the at least one tube.

8. An emulsion treatment system, comprising:

a coalescing apparatus comprising a casing comprising an inner chamber for accommodating an electrically insulating fluid, at least one tube comprising solid electrically insulating material extending through the casing and through said inner chamber, each of said at least one tube comprising an intake opening at a first end for receiving an emulsion to be treated and a discharge opening at a second end for discharging the emulsion from the at least one tube, an inner space of each at least one tube being sealed from said chamber so as to prevent emulsion from penetrating into said chamber, a set of electrodes mounted in said chamber, each one of said at least one tube being allotted at least one pair of electrodes of said set, a voltage source configured to apply mutually different electric potentials to the electrodes of each electrode pair so as to form an electric field between them and thereby an electric field inside the respective tube, and a heater configured to heat the electrically insulating fluid to a temperature above a temperature of the emulsion entering said at least one tube so as to allow the electrically insulating fluid in said chamber to transfer heat to the emulsion flowing through said at least one tube and thereby raise the temperature thereof;

a tank comprising an inlet section for receiving an emulsion to be treated in the coalescing apparatus, and an outlet section;

wherein the casing is arranged between the inlet section and the outlet section so as to allow emulsion to flow from the inlet section to the outlet section through said at least one tube; and wherein the casing comprises a first end wall configured to separate said chamber from the inlet section and a second end wall configured to separate said chamber from the outlet section, and wherein the tube extends between the first end wall and the second end wall.

9. The emulsion treatment system according to claim 8, wherein the outlet section comprises a settling chamber.

10. The emulsion treatment system according to claim 8, wherein the inlet section comprises a pre-separation chamber.

11. A method for coalescing one or several emulsion components in an emulsion comprising emulsion components of different electrical properties, the method comprising:

conveying the emulsion through at least one tube of electrically insulating material while the emulsion is heated inside the respective tubes by heat exchange with a heated electrically insulating fluid surrounding the at least one tube and subjected to an electric field generated between electrodes immersed in the electrically insulating fluid surrounding the at least one tube.

* * * * *

UNITED STATES PATENT AND TRADEMARK OFFICE
CERTIFICATE OF CORRECTION

| | | |
|---|---|---|
| PATENT NO. | : 8,414,777 B2 | Page 1 of 1 |
| APPLICATION NO. | : 12/340805 | |
| DATED | : April 9, 2013 | |
| INVENTOR(S) | : Bjorklund et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 900 days.

Signed and Sealed this
Seventh Day of October, 2014

Michelle K. Lee
*Deputy Director of the United States Patent and Trademark Office*